United States Patent
Yang

(10) Patent No.: US 11,432,356 B2
(45) Date of Patent: Aug. 30, 2022

(54) METHOD FOR TRANSMISSION CONTROL, DEVICE, EQUIPMENT AND STORAGE MEDIUM

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 15 days.

(21) Appl. No.: 16/621,186

(22) PCT Filed: Aug. 10, 2017

(86) PCT No.: PCT/CN2017/096916
§ 371 (c)(1),
(2) Date: Dec. 10, 2019

(87) PCT Pub. No.: WO2019/028778
PCT Pub. Date: Feb. 14, 2019

(65) Prior Publication Data
US 2020/0214064 A1 Jul. 2, 2020

(51) Int. Cl.
*H04W 76/15* (2018.01)
*H04L 45/24* (2022.01)

(52) U.S. Cl.
CPC ............ *H04W 76/15* (2018.02); *H04L 45/24* (2013.01)

(58) Field of Classification Search
CPC ........ H04L 45/24; H04L 47/54; H04W 16/04; H04W 28/08; H04W 28/10; H04W 76/16
See application file for complete search history.

(56) References Cited

U.S. PATENT DOCUMENTS

| 9,439,233 B2 | 9/2016 | Kwon | |
| 2015/0092707 A1* | 4/2015 | Kwon | H04L 5/0098 370/329 |

(Continued)

FOREIGN PATENT DOCUMENTS

| CN | 100584114 C | 1/2010 |
| CN | 104427554 A | 3/2015 |

(Continued)

OTHER PUBLICATIONS

InterDigital Communications; "Packet Duplication at PDCP"; 3GPP TSG-RAN WG2 Meeting #97 Athens, Greece, Feb. 13-17, 2017; R2-1701186 (Year: 2017).*

(Continued)

*Primary Examiner* — Gary Mui

(57) ABSTRACT

Disclosed by the embodiments of the present invention are a method for transmission control, a device, equipment and a storage medium; the method may comprise: a first node device controlling a switch state of a data transmission duplication mode; and the first node device sending a notification message to a second node device, wherein the notification message is used to indicate that the data transmission duplication mode is turned on or that the data transmission duplication mode is turned off. Thus, under the condition that the two node devices control data transmission duplication by means of a node device a radio resource control (RRC) message and a medium access control (MAC) message respectively, the modes of the two node devices controlling the duplication data transmission of a carrier are coordinated, thereby avoiding the occurrence of a control conflicts.

20 Claims, 7 Drawing Sheets

(56) References Cited

U.S. PATENT DOCUMENTS

| | | | |
|---|---|---|---|
| 2016/0219481 | A1 | 7/2016 | Wang et al. |
| 2016/0374036 | A1 | 12/2016 | Wang et al. |
| 2017/0071023 | A1 | 3/2017 | Kunz et al. |
| 2017/0142697 | A1 | 5/2017 | Dai et al. |
| 2017/0347302 | A1 | 11/2017 | Li et al. |
| 2018/0279169 | A1* | 9/2018 | Wang .................... H04W 36/03 |
| 2018/0279262 | A1* | 9/2018 | Babaei .................. H04W 72/04 |
| 2018/0309660 | A1* | 10/2018 | Loehr ................... H04W 76/15 |
| 2018/0310202 | A1* | 10/2018 | Lohr ..................... H04W 76/19 |
| 2018/0367288 | A1* | 12/2018 | Vrzic ............... H04W 36/0069 |
| 2019/0098640 | A1* | 3/2019 | Holakouei ........ H04W 28/0236 |
| 2020/0037151 | A1* | 1/2020 | Du ............................ H04L 1/22 |
| 2020/0107392 | A1* | 4/2020 | Yi .......................... H04W 76/34 |
| 2020/0128605 | A1* | 4/2020 | Tang ..................... H04W 12/02 |
| 2020/0169917 | A1* | 5/2020 | Tang ........................ H04L 1/18 |
| 2020/0186292 | A1* | 6/2020 | Zou ....................... H04W 28/12 |
| 2020/0187282 | A1* | 6/2020 | Yu ............................ H04L 1/18 |
| 2020/0205050 | A1* | 6/2020 | Shah ................. H04W 36/0058 |

FOREIGN PATENT DOCUMENTS

| | | |
|---|---|---|
| CN | 104812000 A | 7/2015 |
| CN | 105376801 A | 3/2016 |
| CN | 105637967 A | 6/2016 |
| CN | 106304411 A | 1/2017 |
| CN | 109952725 A | 6/2019 |
| CN | 105637967 B | 11/2019 |
| CN | 112385261 A | 2/2021 |
| JP | 2017152932 A | 8/2017 |
| JP | 2018191288 A | 11/2018 |
| KR | 20150035358 A | 4/2015 |
| RU | 2625935 C2 | 7/2017 |
| WO | 2015136122 A1 | 9/2015 |
| WO | 2016131188 A1 | 8/2016 |
| WO | 2019031490 A1 | 2/2019 |

OTHER PUBLICATIONS

Huawei, HiSilicon; "Activating and deactivating packet duplication"; 3GPP TSG-RAN2 #97bis Spokane, Washington, USA, Apr. 3-7, 2017; R2-1703529 (Year: 2017).*

Electronics Inc.; "Packet duplication with implicit SCell deactivation"; 3GPP TSG-RAN WG2 NR AdHoc Qingdao, China, Jun. 27-Jun. 29, 2017; R2-1706867 (Year: 2017).*

Huawei, HiSilicon; "Robust data transmission during handover using packet duplication"; 3GPP TSG-RAN2 NR Ad HocQingdao, China, Jun. 27-29, 2017; R2-1706710 (Year: 2017).*

Huawei HiSilicon: "Activating and deactivating packet duplication", 3GPP Draft; R2-1703529 Activating and Deacctivating Packet Duplication, 3rd Generation Partnership Project (3GPP), vol. RAN WG2, No. Spokane, Washington, USA; Apr. 3, 2017-Apr. 7, 2017 Mar. 24, 2017 (Mar. 24, 2017), XP051253983, Retrieved from the Internet: URL:http://www.3gpp.org/ftp/tsg_ran/WG2_RL2/TSGR2_97bis/Docs/ [retrleved on Mar. 24, 2017].

LG Electronics Inc: "Remaining issues in packet duplication", 3GPP Draft; R2-1706866 Remaining Issues in Packet Duplication, 3rd Generation Partnership Project (3GPP), vol. RAN WG2, No. Qingdao, China; Jun. 27, 2017-Jun. 29m 2017 Jun. 17, 2017 (Jun. 17, 2017), XP051307171, Retrieved from the Internet: URL:http://www.3gpp.org/ftp/tsg_ran/WG2_RL2/TSGR2_AHs/2017_06_NR/Docs/ [retrieved on Jun. 17, 2017].

ZTE: "Consideration on the activation/deactivation of data duplication for CA", 3GPP Draft; R2-1704660 Consideration on the Activation or Deactivation of Data Duplication for CA, 3rd Generation Partnership Project (3GPP), vol. RAN WG2, No. Hangzhou, China; May 15, 2017-May 19, 2017 May 14, 2017 (May 14, 2017), XP051275205, Retrieved from the Internet: URL:http://www.3gpp.org/ftp/Meetings_3GPP_SYNC/RAN2/Docs/ [retrieved on May 14, 2017].

Ericsson: "Split SRB: Remaining issues of initial state, path selection and duplication", 3GPP Draft; R2-1706630—Split SRB Remaining Issues of Initial State, Path Selection and Duplication, 3rd Generation Partnership Project (3GPP), vol. RAN WG2, No. Qingdao; Jun. 27, 2017-Jun. 29, 2017 Jun. 16, 2017 (Jun. 16, 2017), XP051306798, Retrieved from the Internet: URL:http://www.3gpp.org/ftp/tsg_ran/WG2_RL2/TSGR2_AHs/2017_06_NR/Docs/ [retrieved on Jun. 16, 2017].

Supplementary European Search Report in the European application No. 17921162.8, dated Mar. 24, 2020.

English translation of the Written Opinion of the International Search Authority in the international application No. PCT/CN2017/096916, dated Apr. 28, 2018.

First Office Action of the European application No. 17921162.8, dated Dec. 16, 2020.

First Office Action of the Russian application No. 2020101624, dated Jan. 14, 2021.

First Office Action of the Canadian application No. 3066667 dated Feb. 9, 2021.

International Search Report in the International application No. PCT/CN2017/096916, dated Apr. 28, 2018.

Written Opinion of the International Search Authority in the international application No. PCT/CN2017/096916, dated Apr. 28, 2018.

Ericsson, "Data duplication in lower layers (HARQ)", 3GPP TSG-RAN WG2 #97 Tdoc R2-1702032, Athens, Greece, Feb. 13-17, 2017, Revision of R2-1700833.

First Office Action of the Chilean application No. 202000021, dated Mar. 16, 2021.

First Office Action of the Chinese application No. 202010086204.7, dated Apr. 19, 2021.

Second Office Action of the European application No. 17921162.8, dated Jun. 1, 2021.

Office Action of the Indian application No. 202017000590, dated Jul. 9, 2021.

Technical Specification, 3rd Generation Partnership Project, Technical Specification Group Radio Access Network; Evolved Universal Terrestrial Radio Access (E-UTRA) and NR; Multi-connectivity; Stage 2 (Release 15) [online], 3GPP TS 37.340 v0.2.1 (Aug. 2017) (R2-1708080), Aug. 9, 2017, p. 1-43.

ZTE, Configuration of SCG SRB and Split & Duplicated SRB [online], 3GPP TSG RAN WG3#Ad-hoc R3-172053, Jun. 19, 2017, p. 1-7.

Nokia, Alcatel-Lucent Shanghai Bell, Duplication Impacts to MAC [online], 3GPP TSG-RAN WG2 Meeting#98 R2-1704272, May 4, 2017, p. 1-3.

Huawei, HiSilicon, Configuration and control of packet duplication [online], 3GPP TSG RAN WG2 NR Ad Hoc R2-1706716, Jun. 17, 2017, p. 1-6.

First Office Action of the Japanese application No. 2020-500796, dated Jun. 15, 2021.

Second Office Action of the Chilean application No. 202000021, dated Jul. 12, 2021.

Second Office Action of the Chinese application No. 202010086204.7, dated Jul. 20, 2021.

First Office Action of the Taiwanese application No. 107127958, dated Dec. 30, 2021.

OPPO, "Considerations on Mobility Issues of Network Slicing", TSG-RAN WG2, NR AdHoc, Qingdao, China, R2-1706330. Jun. 29, 2017, the whole document.

Written Opinion of the Singaporean application No. 11201911772V, dated Sep. 13, 2021.

Second Office Action of the Canadian application No. 3066667, dated Nov. 16, 2021.

First Office Action of the Korean application No. 10-2020-7000324, dated Nov. 29, 2021.

European Search Report in the European application No. 22163211.0, dated Jun. 7, 2022.

First Office Action of the Israeli application No. 271247, dated Jun. 30, 2022.

\* cited by examiner

METHOD FOR TRANSMISSION CONTROL, DEVICE, EQUIPMENT AND STORAGE MEDIUM

TECHNICAL FIELD

The present disclosure relates to a data transmission technology in the field of wireless communication, and particularly to a transmission control, a device, equipment and a storage medium.

BACKGROUND

A Dual Connectivity (DC) technology is introduced into 3rd Generation Partnership Project (3GPP) Long Term Evolution (LTE) Release 12.0, and User Equipment (UE) may be connected to more than one cell station at the same time. For example, the UE may be connected to a Main Evolved Node B (MeNB) and at least one Secondary Evolved Node B (SeNB) at the same time. When UE is connected to two cells, the UE may receive, from the two cells, or send data bearers substantially at the same time, so that related data of the UE may be split.

A DC network architecture in a related art is shown in FIG. 1. An MeNB is connected with an SeNB through an X2 interface, and both the MeNB and the SeNB are connected with a network infrastructure through backhauls link respectively. In a data transmission process, a split bearer protocol architecture shown in FIG. 2 is usually adopted in the related art. An MeNB serves as a splitting anchor. For example, for downlink data, the downlink data is split in a Packet Data Convergence Protocol (PDCP) layer and a Radio Link Control (RLC) layer and, after being sent to the MeNB and an SeNB respectively, is transmitted to UE through own split bearers respectively. After the downlink data arrives at the UE, a PDCP layer of the UE may detect that the two split bearers contain the same downlink data, and thus the PDCP layer of the UE may discard the downlink data contained in one bearer and transmit the retained downlink data to an upper layer of the UE. Uplink data is transmitted in a similar manner. Such a data transmission manner is called a data duplication transmission manner.

For this transmission manner, a bearer has a data duplication transmission function and the data duplication transmission function of the bearer may be activated or deactivated through a Radio Resource Control (RRC) instruction or a Medium Access Control (MAC) instruction. For a DC architecture, since each of an MeNB and an SeNB may send an RRC instruction or a MAC instruction to control a bearer, a manner for controlling the bearer based on the RRC instruction being different from a manner for controlling the bearer based on the MAC instruction, when one of the MeNB and the SeNB controls the bearer through the RRC instruction and the other controls the bearer through the MAC instruction, a control conflict may occur.

SUMMARY

For solving the technical problem, embodiments of the disclosure are intended to provide a transmission control method, a device, equipment and a storage medium. Control manners of an MeNB and an SeNB for data duplication transmission of a bearer are coordinated to avoid occurrence of a control conflict.

The technical solutions of the disclosure may be implemented as follows.

According to a first aspect, the embodiments of the disclosure provide a transmission control method, which may be applied to a first node device, which controls data duplication transmission through an RRC message. The method may include the following operations.

The first node device controls an on-off state of a data duplication transmission mode.

The first node device sends a notification message to a second node device. The notification message indicates that the data duplication transmission mode is in the on state or the data duplication transmission mode is in the off state.

In the solution, the operation that the first node device controls the on-off state of the data duplication transmission mode may include the following operations.

The first node device turns on the data duplication transmission mode through the RRC message.

Or, the first node device turns off the data duplication transmission mode through the RRC message.

In the solution, the operation that the first node device sends the notification message to the second node device may include the following operation.

The first node device sends the notification message to the second node device through an interface between network nodes.

According to a second aspect, the embodiments of the disclosure provide a transmission control method, which may be applied to a second node device, which controls data duplication transmission through a MAC message. The method may include the following operations.

The second node device receives a notification message sent by a first node device. The notification message indicates that a data duplication transmission mode is in an on state or the data duplication transmission mode is in an off state.

The second node device determines whether to control an activation state of a data duplication transmission capability through the MAC message according to the on-off state, indicated in the notification message, of the data duplication transmission mode. The activation state includes activated and deactivated states.

In the solution, the operation that the second node device determines whether to control the activation state of the data duplication transmission capability through the MAC message according to the on-off state, indicated in the notification message, of the data duplication transmission mode may include the following operations.

Responsive to determining, by the second node device according to the notification message, that the data duplication transmission mode is in the on state, the second node device controls the activation state of the data duplication transmission capability through the MAC message.

Responsive to determining, by the second node device according to the notification message, that the data duplication transmission mode is in the off state, the second node device does not control the activation state of the data duplication transmission capability.

According to a third aspect, the embodiments of the disclosure provide a transmission control method, which may be applied to UE, which represents a user side. The method may include the following operations.

An on-off state of a data duplication transmission mode is acquired from a first node device.

A processing strategy for a MAC message sent by a second node device is determined according to the on-off state of the data duplication transmission mode, and the MAC message sent by the second node device is processed according to the processing strategy. The first node device controls data duplication transmission through an RRC message. The second node device is a node device which controls data duplication transmission through the MAC message.

In the solution, the operation that the on-off state of the data duplication transmission mode is acquired from the first node device may include the following operation.

The RRC message sent by the first node device is acquired or monitored, and the RRC message is analyzed to control whether the first node device controls the on-off state of the data duplication transmission mode and control the first node device to turn on or turn off the data duplication transmission mode.

In the solution, the operation that the processing strategy for the MAC message sent by the second node device is determined according to the on-off state of the data duplication transmission mode and the MAC message sent by the second node device is processed according to the processing strategy may include the following operations.

Responsive to the data duplication transmission mode being in the on state, the MAC message sent by the second node device is received, and a data duplication transmission capability is activated or deactivated according to the MAC message. The MAC message indicates an activation state of the data duplication transmission capability and the activation state includes an activated or deactivated state.

Responsive to the data duplication transmission mode being in the off state, the MAC message sent by the second node device is ignored.

According to a fourth aspect, the embodiments of the disclosure provide a node device, which may include a control part and a sending part. The control part may be configured to control an on-off state of a data duplication transmission mode.

The sending part may be configured to send a notification message to a second node device. The notification message indicates that the data duplication transmission mode is in the on state or the data duplication transmission mode is in the off state.

In the solution, the control part may be configured to turn on the data duplication transmission mode through an RRC message. Or, the control part may be configured to turn off the data duplication transmission mode through the RRC message. Or, the control part may be configured to not turn on the data duplication transmission mode. The data duplication transmission mode is initially in the off state and.

According to a fifth aspect, the embodiments of the disclosure provide a node device, which may include a receiving part and a determination part.

The receiving part may be configured to receive a notification message sent by a first node device. The notification message indicates that a data duplication transmission mode is in an on state or the data duplication transmission mode is in an off state.

The determination part may be configured to determine whether to control an activation state of a data duplication transmission capability through a MAC message according to the on-off state, indicated in the notification message, of the data duplication transmission mode, the activation state including activated and deactivated states.

In the solution, the determination part may be configured to perform the following operations.

Responsive to determining according to the notification message that the data duplication transmission mode is in the on state, control the activation state of the data duplication transmission capability through the MAC message.

Responsive to determining according to the notification message that the data duplication transmission mode is in the off state, not control the activation state of the data duplication transmission capability.

According to a sixth aspect, the embodiments of the disclosure provide UE, which may include an acquisition part, a determination part and a processing part. The acquisition part may be configured to acquire an on-off state of a data duplication transmission mode from a first node device.

The determination part may be configured to determine a processing strategy for a MAC message sent by a second node device according to the on-off state of the data duplication transmission mode.

The processing part may be configured to process the MAC message sent by the second node device according to the processing strategy. The first node device controls data duplication transmission through an RRC message. The second node device is a node device which controls data duplication transmission through the MAC message.

In the solution, the acquisition part may be configured to acquire or monitor the RRC message sent by the first node device and analyze the RRC message to learn about whether the first node device controls the on-off state of the data duplication transmission mode and that the first node device turns on or turns off the data duplication transmission mode.

In the solution, the processing part may be configured to perform the following operations.

Responsive to the data duplication transmission mode being in the on state, receive the MAC message sent by the second node device and activate or deactivate a data duplication transmission capability according to the MAC message. The MAC message indicates an activation state of the data duplication transmission capability and the activation state includes an activated or deactivated state; and Responsive to the data duplication transmission mode being in the off state, ignore the MAC message sent by the second node device.

According to a seventh aspect, the embodiments of the disclosure provide a node device, which may include: a storage medium, configured to store an executable instructions; and a processor, configured to execute the stored executable instructions, the executable instructions being configured to execute any transmission control method in the first aspect.

According to an eighth aspect, the embodiments of the disclosure provide a node device, which may include: a storage medium, configured to store an executable instructions; and a processor, configured to execute the stored executable instructions, the executable instructions being configured to execute the transmission control method in the second aspect.

According to a ninth aspect, the embodiments of the disclosure provide UE, which may include: a storage medium, configured to store an executable instructions; and a processor, configured to execute the stored executable instructions, the executable instructions being configured to execute any transmission control method in the third aspect.

According to a tenth aspect, the embodiments of the disclosure provide a computer storage medium, which may store a machine instructions, the machine instructions being executed by one or more processors to enable the processor to execute the steps of any transmission control method in the first aspect.

According to an eleventh aspect, the embodiments of the disclosure provide a computer storage medium, which may store a machine instructions, the machine instructions being executed by one or more processors to enable the processor to execute the steps of the transmission control method in the second aspect.

According to a twelfth aspect, the embodiments of the disclosure provide a computer storage medium, which may store a machine instructions, the machine instructions being executed by one or more processors to enable the processor to execute the steps of any transmission control method in the third aspect.

According to a thirteenth aspect, the embodiments of the disclosure provide a transmission control system, which may include a first node device and a second node device. A control manner of the first node device for data duplication transmission is different from a control manner of the second node device for data duplication transmission.

The first node device may be configured to send a notification message to the second node device through a network device. The notification message indicates that a data duplication transmission mode is in an on state or the data duplication transmission mode is in an off state.

The second node device may be configured to determine according to the notification message that the data duplication transmission mode is in the on state or the off state.

Responsive to the data duplication transmission mode being in the on state, control an activation state of a data duplication transmission capability through a MAC message. The activation state includes an activated or deactivated state.

Responsive to the data duplication transmission mode being in the off state, not control the activation state of the data duplication transmission capability.

According to a fourteenth aspect, the embodiments of the disclosure provide a transmission control system, which may include a first node device, a second node device and UE. A control manner of the first node device for data duplication transmission is different from a control manner of the second node device for data duplication transmission.

The first node device may be configured to control an on-off state of a data duplication transmission mode through an RRC message.

The UE may be configured to acquire the on-off state of the data duplication transmission mode.

The UE may further be configured to determine a processing strategy for a MAC message sent by the second node device according to the on-off state of the data duplication transmission mode and process the MAC message sent by the second node device according to the processing strategy.

In the solution, the UE may be configured to perform the following operations.

Responsive to the data duplication transmission mode being in the on state, receive the MAC message sent by the second node device and activate or deactivate a data duplication transmission capability according to the MAC message. The MAC message indicates an activation state of the data duplication transmission capability and the activation state includes an activated or deactivated state; and Responsive to the data duplication transmission mode is in the off state, ignore the MAC message sent by the second node device.

The embodiments of the disclosure provide a transmission control method, a device, equipment and a storage medium. The first node device, after controlling the data duplication transmission mode to be turned on or turned off notifies the on-off state of the data duplication transmission mode to the second node device to enable the second node device to determine whether to control the activation state of the data duplication transmission capability through the MAC message according to the on state of the data duplication transmission mode or the off state of the data duplication transmission mode. Therefore, control manners of the two node devices for data duplication transmission of a bearer are coordinated under the condition that the two node devices control data duplication transmission through the RRC message and the MAC message respectively, and occurrence of a control conflict is further avoided.

DETAILED DESCRIPTION

The technical solutions in the embodiments of the disclosure will be clearly and completely described below in combination with the drawings in the embodiments of the disclosure.

Figure 1:
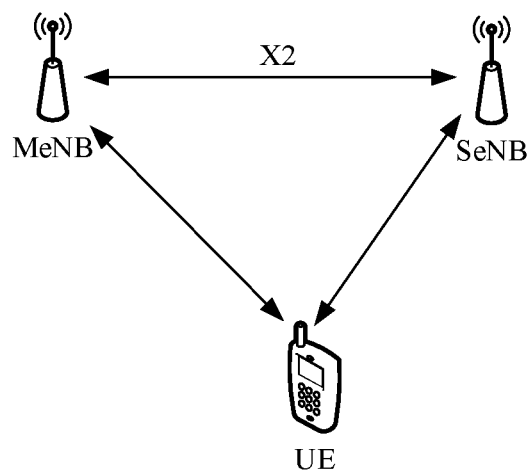
FIG. 1 is a schematic diagram of a DC network architecture.
Figure 2:
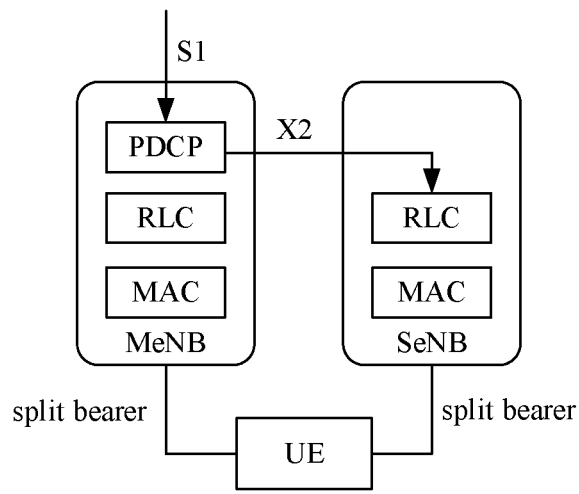
FIG. 2 is a schematic diagram of a split bearer protocol architecture.

In combination with a DC network architecture shown in FIG. 1 and a protocol architecture shown in FIG. 2, a serving Cell Group (CG) provided by an MeNB is called a Master Cell Group (MCG), and a serving CG provided by an SeNB is called a Secondary Cell Group (SCG). A CG where a PDCP layer is located is called an anchor CG, so that the anchor CG is usually the MCG, and the anchor CG may also be the SCG under some special circumstances. There are no specific limits made thereto in the embodiment. It is to be noted in descriptions of subsequent embodiments that the MCG is provided by a master node device. The master node device includes, but not limited to, the MeNB. The SCG is provided by a slave node device. The slave node device includes, but not limited to, the SeNB.

Figure 3:
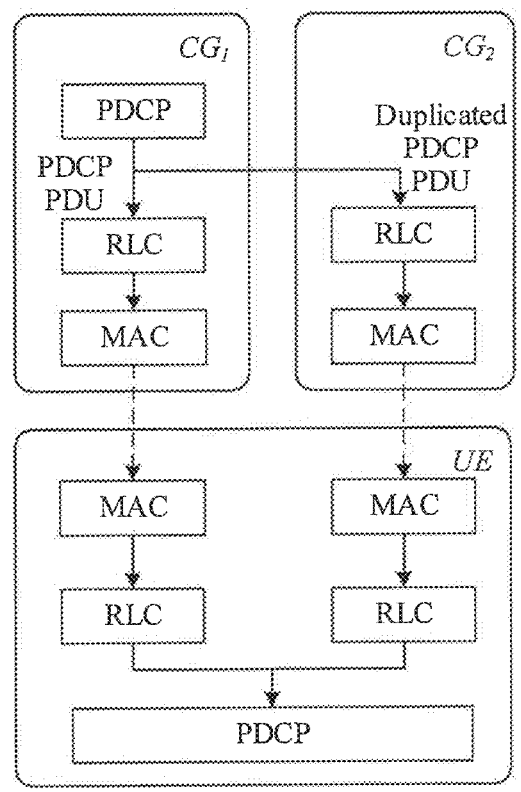
FIG. 3 is a data duplication transmission protocol architecture according to an embodiment of the disclosure.

When downlink data is transmitted by use of the DC network architecture shown in FIG. 1, referring to FIG. 3, a PDCP layer of an anchor CG (CG1) may duplicate a PDCP Protocol Data Unit (PDU) to obtain two PDCP PDUs that are the same, one being the raw PDCP PDU and the other being the duplicated PDCP PDU. The raw PDCP PDU sequentially passes through an RLC layer and MAC layer of the CG1, then arrives at a MAC layer and RLC layer of UE through an air interface and is finally converged in a PDCP layer of the UE. The duplicated PDCP PDU sequentially passes through an RLC layer and MAC layer of a non-anchor CG (CG2), then arrives at the MAC layer and RLC layer of the UE through the air interface and is finally converged in the PDCP layer of the UE. The PDCP layer of the UE, when monitoring that the two PDCP PDUs are the same, may discard one of them and upload the retained PDCP PDU to a high layer of the UE.

Figure 4:
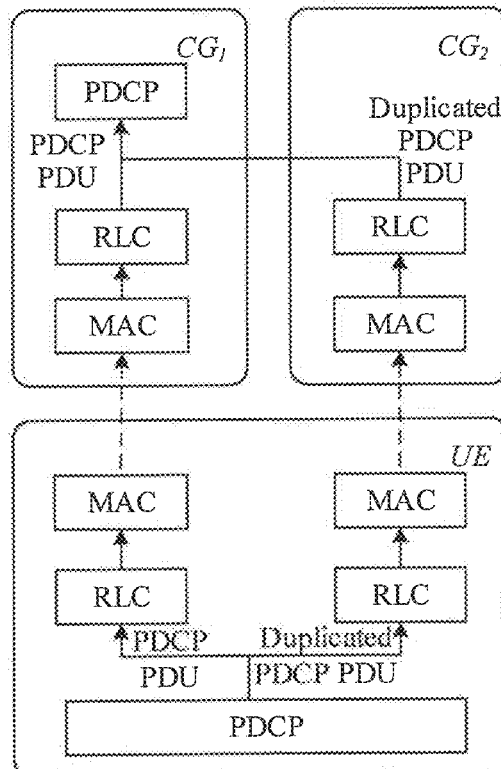
FIG. 4 is another data duplication transmission protocol architecture according to an embodiment of the disclosure.

When uplink data is transmitted by use of the DC network architecture shown in FIG. 1, referring to FIG. 4, the PDCP layer of UE duplicates a PDCP PDU to obtain two PDCP PDUs that are the same, one being the raw PDCP PDU and the other being a duplicated PDCP PDU. The raw PDCP PDU sequentially passes through the RLC layer and MAC layer of the UE, then arrives at the MAC layer and RLC layer of the CG1 through the air interface and is finally converged in the PDCP layer of the CG1. The duplicated PDCP PDU sequentially passes through the RLC layer and MAC layer of the UE, then arrives at the MAC layer and RLC layer of the CG2 through the air interface and is finally converged in the PDCP layer of the CG1 through an X2 interface. The PDCP layer of the CG1, when monitoring that the two PDCP PDUs are the same, may discard one of them and upload the retained PDCP PDU to a high layer of a network side.

Based on the transmission protocol architectures shown in FIG. 3 and FIG. 4, when the PDCP layer is located in an MCG, it is called an MCG split bearer; and if the PDCP layer is located in an SCG, it is called an SCG split bearer. In the related art, each of the MCG and the SCG activates or deactivates a data duplication transmission capability of a certain bearer through a MAC Control Element (CE) and may also control data duplication transmission of a certain transmission through an RRC message. It is to be noted that slow control may be implemented through the RRC message, for example, controlling whether a bearer is in a data duplication transmission mode and controlling a related parameter (for example, a split bearer threshold, a switching path and so on) of another mode. Fast control may be implemented through the MAC CE, for example, controlling whether to activate the data duplication transmission capability when the bearer is in the data duplication transmission mode. Under this circumstance, if the RRC message and a MAC message are from different base stations or CGs, since the data duplication transmission mode of the bearer may be controlled through both the RRC message and the MAC message, coordination for avoiding occurrence of a control conflict is required.

For the abovementioned problem, the disclosure is described through the following embodiments.

Embodiment 1

Figure 5:
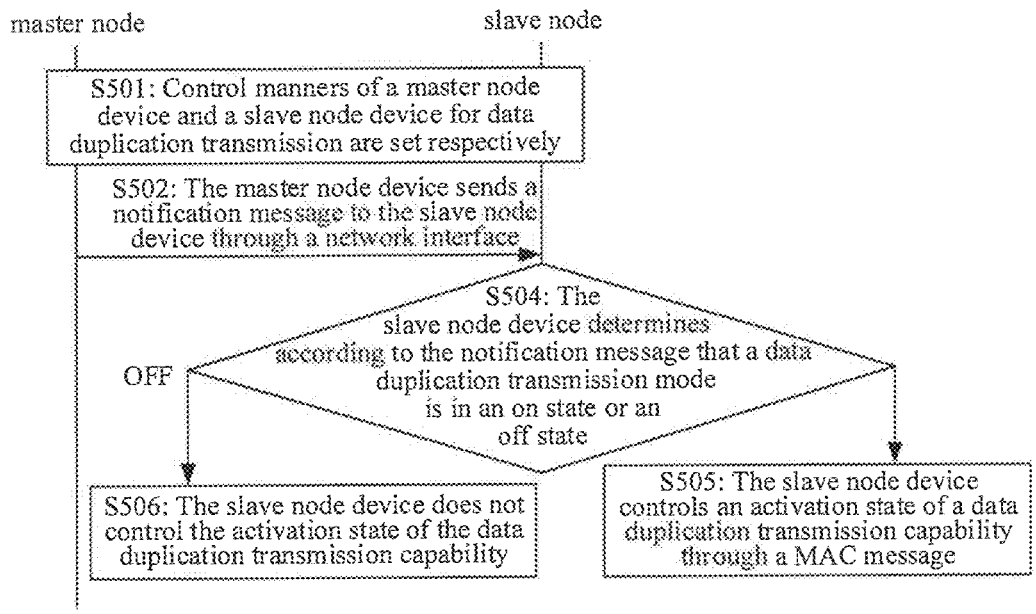
FIG. 5 is a flowchart of a transmission control method according to an embodiment of the disclosure.

Referring to FIG. 5, a transmission control method provided in the embodiment of the disclosure is shown. The method may be applied to a network system with a master node device and a slave node device. The method may include the following steps.

In S501, control manners of the master node device and the slave node device for data duplication transmission are set respectively.

It is to be noted that, in subsequent implementation of the disclosure, control over data duplication transmission refers to control over data duplication transmission of a bearer. Elaborations are omitted in the subsequent embodiments. The control manner of the master node device for data duplication transmission is different from the control manner of the slave node device for data duplication transmission. For example, the control manner of the master node device for data duplication transmission may be control through an RRC message, and in such case, the control manner of the slave node device for data duplication transmission is control through a MAC message. In addition, the control manner of the master node device for data duplication transmission may be control through a MAC message, and in such case, the control manner of the slave node device for data duplication transmission is control through an RRC message. For clearly describing the technical contents of the embodiment, the technical solution shown in FIG. 5 is preferably as follows: the control manner of the master node device for data duplication transmission may be control through the RRC message, and the control manner of the slave node device for data duplication transmission may be control through the MAC message.

In S502, the master node device sends a notification message to the slave node device through a network interface.

The notification message indicates that a data duplication transmission mode is in an on state or the data duplication transmission mode is in an off state.

It is to be noted that, whether the bearer is in the data duplication transmission mode may be controlled through the RRC message, that is, the master node device may turn on or turn off the data duplication transmission mode of the bearer through the RRC message. Specifically, if the master node device turns on the data duplication transmission mode through the RRC message before S502, the notification message indicates that the data duplication transmission mode is in the on state. If the data duplication transmission mode is initially in the off state and the master node device does not turn on the data duplication transmission mode before S502, or if the master node device turns off the data duplication transmission mode through the RRC message before S502, the notification message indicates that the data duplication transmission mode is in the off state.

In S504, the slave node device determines according to the notification message that a data duplication transmission mode is in an on state or an off state. When the data duplication transmission mode is in the on state, S505 is executed. When the data duplication transmission mode is in the off state, S506 is executed.

At block S505, the slave node device controls an activation state of a data duplication transmission capability through a MAC message.

It is to be noted that the activation state may include an activated or deactivated state. For S505, specifically, when the data duplication transmission mode is in the on state, the slave node device may control the activated state of the data duplication transmission capability by use of a MAC CE and may also control the deactivated state of the data duplication transmission capability by use of the MAC CE.

In S506, the slave node device does not control the activation state of the data duplication transmission capability.

In the technical solution shown in FIG. 5, since the master node device is set to control data duplication transmission through the RRC message and the slave node device is set to control data duplication transmission through the MAC message, in a process that the master node device and the slave node device control data duplication transmission respectively, the data duplication transmission mode is controlled to be turned on and turned off through the RRC message at first, and after the data duplication transmission mode is determined to be turned on or turned off, the activation state of the data duplication transmission capability is controlled through the MAC message. Therefore, under the condition that the two node devices control data duplication transmission through the RRC message and the MAC message respectively, control may be implemented according to a sequence described in the solution shown in FIG. 5. The control manners of the two node devices for data duplication transmission of the bearer are coordinated, and occurrence of a control conflict is further avoided.

For the technical solution shown in FIG. 5, it is also to be noted that, if it is set that the control manner of the master node device for data duplication transmission is control through the MAC message and the control manner of the slave node device for data duplication transmission is control through the RRC message, another preferred example may be obtained according to the technical solution shown in FIG. 5, namely as follows.

If the slave node device turns on the data duplication transmission mode through the RRC message, the slave node device sends a notification message to the master node device. The notification message indicates that the data duplication transmission mode is turned on. The master node device, after receiving the notification message, determines that the data duplication transmission mode is in the on state. In such case, the master node device may control the activation state of the data duplication transmission capability through the MAC message.

If the data duplication transmission mode is initially in the off state and the slave node device does not turn on the data duplication transmission mode, or if the slave node device turns off the data duplication transmission mode through the RRC message, the notification message sent to the master node device by the slave node device indicates that the data duplication transmission mode is turned off. The master node device, after receiving the notification message, determines that the data duplication transmission mode is in the off state. In such case, the master node device does not control the activation state of the data duplication transmission capability by use of the MAC message.

From the above solution, it can be seen that the master node device and the slave node device determine whether the data duplication transmission mode is turned on or turned off by use of the RRC message through the notification message and then determine whether to control the activation state of the data duplication transmission capability by use of the MAC message according to the on or off state of the data duplication transmission mode. So that ordered control over data duplication transmission is implemented by negotiation between the two node devices, the control manners of the two node devices for data duplication transmission of the bearer are coordinated, and occurrence of the control conflict is further avoided.

in the embodiment of the disclosure is shown. The method may be applied to a first node device which controls data duplication transmission through an RRC message. The method may include the following steps.

In S601, the first node device controls an on-off state of a data duplication transmission mode.

It can be understood that, since each of a master node device and a slave node device has a capability in controlling data duplication transmission through an RRC message and a MAC message, when the first node device controlling data duplication transmission through the RRC message is the master node device, a second node device controlling data duplication transmission through the MAC message is the slave node device. On the other hand, when the first node device controlling data duplication transmission through the RRC message is the slave node device, the second node device controlling data duplication transmission through the MAC message is the master node device. When the technical solution of the embodiment of the disclosure is subsequently described, whether the first node device or the second node device is the master node device or the slave node device is not specifically limited.

It is to be noted that, since the on-off state of the data duplication transmission mode is controlled through the RRC message, the operation in S601 that the first node device controls the on-off state of the data duplication transmission mode may specifically include the following operations.

The first node device turns on the data duplication transmission mode through the RRC message.

Or, the first node device turns off the data duplication transmission mode through the RRC message.

In S602, the first node device sends a notification message to a second node device. The notification message indicates that the data duplication transmission mode is in the on state or the data duplication transmission mode is in the off state.

It can be understood that, the second node device, after receiving the notification message, may determine whether to control an activation state of a data duplication transmission capability through the MAC message according to the on-off state, indicated in the notification message, of the data duplication transmission mode.

The operation in S602 that the first node device sends the notification message to the second node device may specifically include the following operation.

The first node device sends the notification message to the second node device through an interface between network nodes.

Specifically, the interface between the network nodes includes an X2 interface.

Through the embodiment, the first node device, after controlling the data duplication transmission mode to be turned on or turned off, notifies the on-off state of the data duplication transmission mode to the second node device to enable the second node device to determine whether to control the activation state of the data duplication transmission capability through the MAC message according to the on state of the data duplication transmission mode or the off state of the data duplication transmission mode. Therefore, under the condition that the two node devices control data duplication transmission through the RRC message and the MAC message respectively, control manners of the two node devices for data duplication transmission of a bearer are coordinated, and occurrence of a control conflict is further avoided.

Embodiment 2

Figure 6:
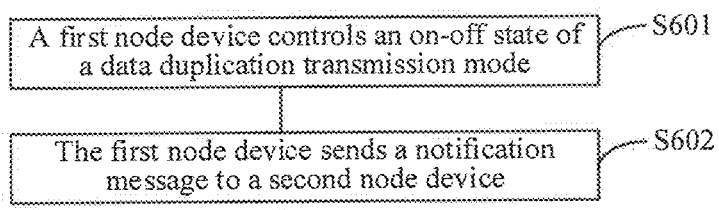
FIG. 6 is a flowchart of another transmission control method according to an embodiment of the disclosure.

Based on the same inventive concept of embodiment 1, referring to FIG. 6, a transmission control method provided Embodiment 3

Figure 7:
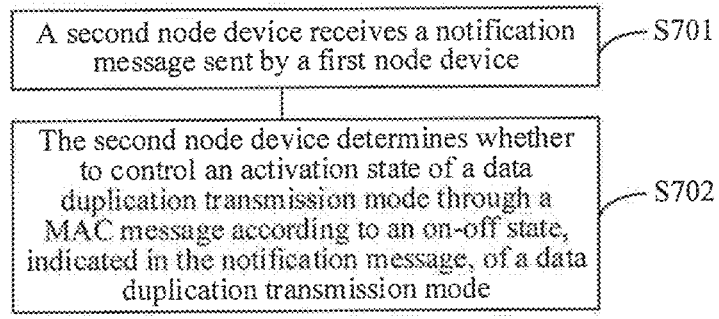
FIG. 7 is a flowchart of yet another transmission control method according to an embodiment of the disclosure.

Based on the same inventive concept of embodiment 1, referring to FIG. 7, a transmission control method provided in the embodiment of the present disclosure is shown. The method may be applied to a second node device which controls data duplication transmission through a MAC message. The method may include the following steps.

In S701, the second node device receives a notification message sent by a first node device.

The notification message indicates that a data duplication transmission mode is in an on state or the data duplication transmission mode is in an off state.

Specifically, the second node device may receive the notification message sent by the first node device through an interface between network nodes. The interface between the network nodes is preferably an X2 interface. There are no specific limits made thereto in the embodiment.

In S702, the second node device determines whether to control an activation state of a data duplication transmission capability through the MAC message according to the on-off state, indicated in the notification message, of the data duplication transmission mode.

In a possible implementation mode, S702 may include the following operations.

Responsive to determining, by the second node device according to the notification message, that the data duplication transmission mode is in the on state, the second node device controls the activation state of the data duplication transmission capability through the MAC message.

Responsive to determining, by the second node device according to the notification message, that the data duplication transmission mode is in the off state, the second node device does not control the activation state of the data duplication transmission capability.

Specifically, the activation state may include activated and deactivated states.

Through the embodiment, the second node device, after the first node device controls the on-off state of the data duplication transmission mode, determines whether to control the activation state of the data duplication transmission capability through the MAC message according to the on-off state of the data duplication transmission mode. Therefore, under the condition that the two node devices control data duplication transmission through the RRC message and the MAC message respectively, control manners of the two node devices for data duplication transmission of a bearer are coordinated, and occurrence of a control conflict is further avoided.

Embodiment 4

Coordination between control manners of node devices for data duplication transmission of a bearer in a manner of negotiation and mutual notification is expressed in the technical solutions shown in FIG. 5 to FIG. 7. Based on the same inventive concept of the abovementioned embodiments and based on the concept of coordinating control over data duplication transmission of the bearer between the node devices, referring to FIG. 8, another transmission control method provided in the embodiment is shown. The method may be applied to a network system with a master node device, a slave node device and UE. The method may include the following steps.

In S801, control manners of the master node device and the slave node device for data duplication transmission are set respectively.

Figure 8:
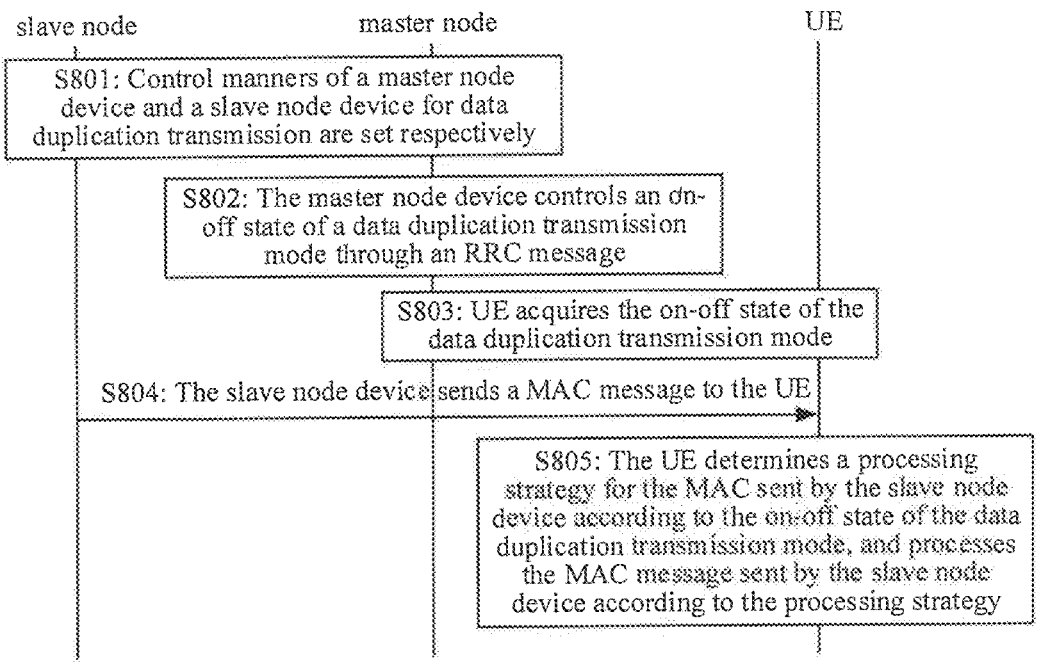
FIG. 8 is a flowchart of yet another transmission control method according to an embodiment of the disclosure.

It is to be noted that the control manner of the master node device for data duplication transmission is different from the control manner of the slave node device for data duplication transmission. For example, the control manner of the master node device for data duplication transmission may be control through an RRC message, and in such case, the control manner of the slave node device for data duplication transmission is control through a MAC message. In addition, the control manner of the master node device for data duplication transmission may be control through a MAC message, and in such case, the control manner of the slave node device for data duplication transmission is control through an RRC message. Moreover, the master node device and the slave node device are mutually independent and do not interact with or notify each other. For clearly describing the technical contents of the embodiment, the technical solution shown in FIG. 8 is preferably as follows: the control manner of the master node device for data duplication transmission may be control through the RRC message, and the control manner of the slave node device for data duplication transmission may be control through the MAC message.

In S802, the master node device controls an on-off state of a data duplication transmission mode through an RRC message.

It is to be noted that the on-off state of the data duplication transmission mode may indicate that the data duplication transmission mode is in the on state or the off state. The master node device may control the data duplication transmission mode to be in the on or off state through the RRC message.

In S803, the UE acquires the on-off state of the data duplication transmission mode.

It can be understood that the UE, as a user side, may acquire or monitor the RRC message sent by the master node device and analyze the RRC message to learn about whether the master node device controls the on-off state of the data duplication transmission mode, and may further learn about whether the master node device controls the data duplication transmission mode to be turned on or turned off.

In S804, the slave node device sends a MAC message to the UE.

It is to be noted that the MAC message indicates an activation state of a data duplication transmission capability and the activation state may include an activated or deactivated state.

In S805, the UE determines a processing strategy for the MAC message sent by the slave node device according to the on-off state of the data duplication transmission mode and processes the MAC message sent by the slave node device according to the processing strategy.

Specifically, when the data duplication transmission mode is in the on state, the UE receives the MAC message sent by the slave node device and activates or deactivates the data duplication transmission capability according to the MAC message.

When the data duplication transmission mode is in the off state, the UE ignores the MAC message sent by the slave node device, thereby avoiding the UE activating or deactivating the data duplication transmission capability according to the MAC message when the data duplication transmission mode is in the off state and further avoiding occurrence of a control conflict.

It can be understood that there is no strict sequence between S804 and S805 and this is because the operation that the UE determines the processing strategy for the MAC message sent by the slave node device is related to the state of the data duplication transmission mode and unrelated to whether the slave node device sends the MAC. In the embodiment, S804 is preferably executed before S805.

For the technical solution shown in FIG. 8, it is set that the master node device controls data duplication transmission through the RRC message, it is also set that the slave node device controls data duplication transmission through the MAC message. The UE determines the data duplication transmission mode is on or off according to the RRC message at first. Then the UE may receive the MAC message and control the activation state of the data duplication transmission capability according to the MAC message only when the data duplication transmission mode is on. When the data duplication transmission mode is off, the UE ignores the MAC message, so that occurrence of the control conflict is avoided. It can be seen that, in the embodiment, the user side, except the master node device and the slave node device, coordinates the control manners for data duplication transmission of the bearer and the two node devices are not required to communicate with each other.

For the technical solution shown in FIG. 8, it is also to be noted that, if it is set that the control manner of the master node device for data duplication transmission is control through the MAC message and the control manner of the slave node device for data duplication transmission is control through the RRC message, another preferred example may be obtained according to the technical solution shown in FIG. 8, namely as follows.

If the slave node device turns on the data duplication transmission mode through the RRC message, the UE learns from the slave node device about that the data duplication transmission mode is in the on state, and in such case, the UE may receive the MAC message sent by the master node device and activate or deactivate the data duplication transmission capability according to the MAC message.

If the slave node device turns off the data duplication transmission mode through the RRC message, the UE learns from the slave node device about that the data duplication transmission mode is in the off state, and in such case, the UE may ignore the MAC message sent by the master node device, thereby avoiding a conflict between control over data duplication transmission respectively through the MAC message and the RRC message.

From the above solution, it can be seen that the user side except the master node device and the slave node device coordinates control over data duplication transmission, so that information interaction between the master node device and the slave node device is avoided. Therefore, ordered control over data duplication transmission is implemented, the control manners of the two node devices for data duplication transmission of the bearer are coordinated, and occurrence of the control conflict is further avoided. Moreover, communication interaction between the two node devices is reduced, and communication pressure of a network side is reduced.

Embodiment 5

Figure 9:
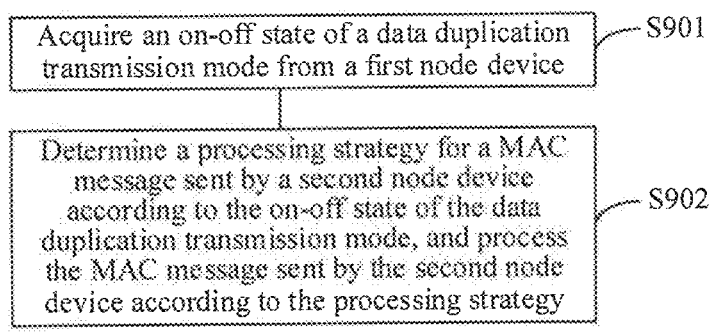
FIG. 9 is a flowchart of another transmission control method according to an embodiment of the disclosure.

Based on the same inventive concept of embodiment 4, referring to FIG. 9, a transmission control method provided in the embodiment of the disclosure is shown. The method may be applied to UE representing a user side. The method may include the following steps.

In S901, an on-off state of a data duplication transmission mode is acquired from a first node device.

It is to be noted that, since each of a master node device and a slave node device has a capability in controlling data duplication transmission through an RRC message and a MAC message, like the abovementioned embodiments, in the embodiment, a node device controlling data duplication transmission through the RRC message is the first node device, and a node device controlling data duplication transmission through the MAC message is a second node device. When the technical solution of the embodiment of the disclosure is subsequently described, whether the first node device or the second node device is the master node device or the slave node device is not specifically limited.

For S901, specifically, the UE, as the user side, may acquire or monitor the RRC message sent by the first node device and analyze the RRC message to learn about whether the first node device controls the on-off state of the data duplication transmission mode and that the first node device turns on or turns off the data duplication transmission mode.

In S902, a processing strategy for a MAC message sent by a second node device is determined according to the on-off state of the data duplication transmission mode, and the MAC message sent by the second node device is processed according to the processing strategy.

In a possible implementation mode, S902 may include the following operations.

When the data duplication transmission mode is in the on state, the UE receives the MAC message sent by the slave node device and activates or deactivates a data duplication transmission capability according to the MAC message. It is to be noted that the MAC message indicates an activation state of the data duplication transmission capability and the activation state may include an activated or deactivated state.

When the data duplication transmission mode is in the off state, the UE ignores the MAC message sent by the slave node device. It is to be noted that the MAC message indicates the activation state of the data duplication transmission capability. Therefore, the UE is prevented from activating or deactivating the data duplication transmission capability according to the MAC message when the data duplication transmission mode is in the off state, and occurrence of a control conflict is further avoided.

According to the embodiment, the UE coordinates control over data duplication transmission, so that interaction and notification between the first node device and the second node device are avoided. Therefore, ordered control over data duplication transmission is implemented, the control manners of the two node devices for data duplication transmission of the bearer are coordinated, and occurrence of the control conflict is further avoided. Moreover, communication interaction between the two node devices is reduced, and communication pressure of a network side is reduced.

Embodiment 6

Figure 10:
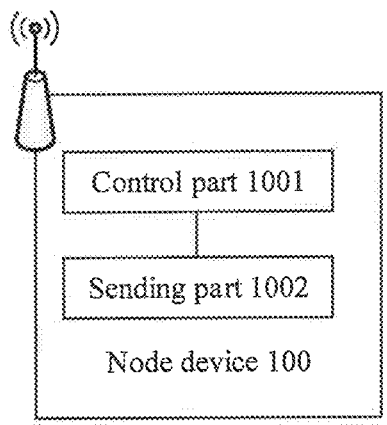
FIG. 10 is a structure diagram of a node device according to an embodiment of the disclosure.

Based on the same technical concept of embodiment 2, referring to FIG. 10, a node device 100 provided in the embodiment of the disclosure is shown. The node device 100 may control data duplication transmission through an RRC message. The node device 100 may include a control part 1001 and a sending part 1002. The control part 1001 is configured to control an on-off state of a data duplication transmission mode.

The sending part 1002 is configured to send a notification message to a second node device. The notification message indicates that the data duplication transmission mode is in the on state or the data duplication transmission mode is in the off state.

In a possible implementation mode, the control part 1001 is configured to turn on the data duplication transmission mode through the RRC message. Or, the control part 1001 is configured to turn off the data duplication transmission mode through the RRC message.

It can be understood that, in the embodiment and other embodiments, "part" may be part of a circuit, part of a processor, part of a program or software and the like, of course, may also be a unit, and may also be modular and non-modular.

In addition, each component in the embodiment may be integrated into a processing unit. Each unit may also exist independently. Two or more than two units may also be integrated into a unit. The integrated unit may be implemented in a hardware form and may also be implemented in form of software function module.

When implemented in form of software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of software product, and the computer software product is stored in a storage medium, including a plurality of instructions configured to enable a computer device (which may be a personal computer, a server, a network device or the like) or a processor to execute all or part of the operations of the method in the embodiment. The storage medium includes: various media capable of storing program codes such as a U disk, a mobile hard disk, a Read Only Memory (ROM), a Random Access Memory (RAM), a magnetic disk or an optical disk.

Therefore, the embodiment provides a computer storage medium, which stores machine instructions, the machine instructions being executed by one or more processors to enable the processor to execute the following operations.

An on-off state of a data duplication transmission mode is controlled.

A notification message is sent to a second node device. The notification message indicates that the data duplication transmission mode is in the on state or the data duplication transmission mode is in the off state.

Optionally, as another embodiment, the machine instructions are operated by the processor to further execute the following operations.

The data duplication transmission mode is turned on through an RRC message.

Or, the data duplication transmission mode is turned off through the RRC message.

Optionally, as another embodiment, the machine instruction is operated by the processor to further execute the following operation.

The notification message is sent to the second node device through an interface between network nodes.

Figure 11:
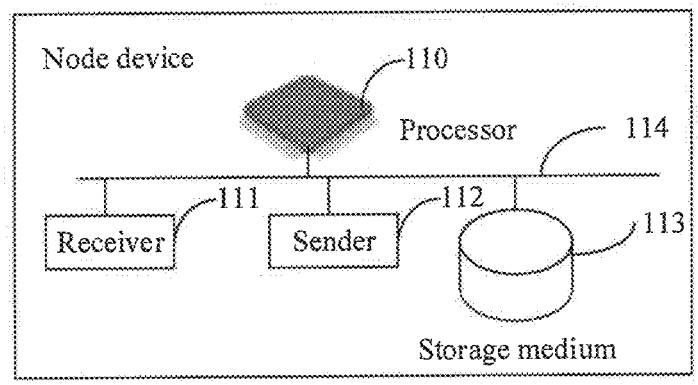
FIG. 11 is an implementation diagram of a hardware structure of a node device according to an embodiment of the disclosure.

In addition, during a practical application, referring to FIG. 11, the control part 1001 may be implemented by a processor 110 located in a node device, specifically a Central Processing Unit (CPU), a Microprocessor Unit (MPU), a Digital Signal Processor (DSP) or a Field-Programmable Gate Array (FPGA), etc. The sending part 1002 may be implemented by a sender 112. The node device may further include a receiver 111 and a storage medium 113. The receiver 111, the sender 112 and the storage medium 113 are all connected with the processor 110 through a system bus 114. The storage medium 113 is configured to store an executable program instruction. The storage medium 113 may include a high-speed RAM and may also include a nonvolatile memory, for example, at least one disk memory. The processor 110 is configured to execute the stored executable instructions, and the executable instructions are configured to execute the operations of the transmission control method of embodiment 2.

Embodiment 7

Figure 12:
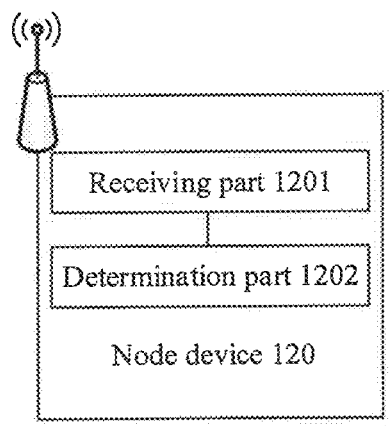
FIG. 12 is a structure diagram of another node device according to an embodiment of the disclosure.

Based on the same inventive concept of embodiment 3, referring to FIG. 12, a node device 120 provided in the embodiment of the disclosure is shown. The node device 120 may control data duplication transmission through a MAC message. The node device 120 may include a receiving part 1201 and a determination part 1202.

The receiving part 1201 is configured to receive a notification message sent by a first node device. The notification message indicates that the data duplication transmission mode is in the on state or the data duplication transmission mode is in the off state.

The determination part 1202 is configured to determine whether to control an activation state of a data duplication transmission capability through the MAC message or not according to the on-off state, indicated in the notification message, of the data duplication transmission mode. The activation state includes activated and deactivated states.

In a possible implementation mode, the determination part 1202 is configured to perform the following operations.

Responsive to determining according to the notification message that the data duplication transmission mode is in the on state, control the activation state of the data duplication transmission capability through the MAC message.

Responsive to determining according to the notification message that the data duplication transmission mode is in the off state, not control the activation state of the data duplication transmission capability.

It can be understood that, in the embodiment and other embodiments, "part" may be part of a circuit, part of a processor, part of a program or software and the like, of course, may also be a unit, and may also be modular and non-modular.

In addition, each component in the embodiment may be integrated into a processing unit, each unit may also exist independently, and two or more than two units may also be integrated into a unit. The integrated unit may be implemented in a hardware form and may also be implemented in form of software function module.

When implemented in form of software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of software product. The computer software product is stored in a storage medium, including a plurality of instructions configured to enable a computer device (which may be a personal computer, a server, a network device or the like) or a processor to execute all or part of the operations of the method in the embodiment. The storage medium includes: various media capable of storing program codes such as a U disk, a mobile hard disk, a ROM, a RAM, a magnetic disk or an optical disk.

Therefore, the embodiment provides a computer storage medium, which stores machine instructions, the machine instructions being executed by one or more processors to enable the processor to execute the following operations.

A notification message sent by a first node device is received. The notification message indicates that a data duplication transmission mode is in an on state or the data duplication transmission mode is in an off state.

Whether to control an activation state of a data duplication transmission capability through a MAC message or not is determined according to the on-off state, indicated in the notification message, of the data duplication transmission mode. The activation state includes activated and deactivated states.

Optionally, as another embodiment, the machine instruction is operated by the processor to further execute the following operations.

Responsive to determining, by a second node device according to the notification message, that the data duplication transmission mode is in the on state, the second node device controls the activation state of the data duplication transmission capability through the MAC message.

Responsive to determining, by the second node device according to the notification message, that the data duplication transmission mode is in the off state, the second node device does not control the activation state of the data duplication transmission capability.

Figure 13:
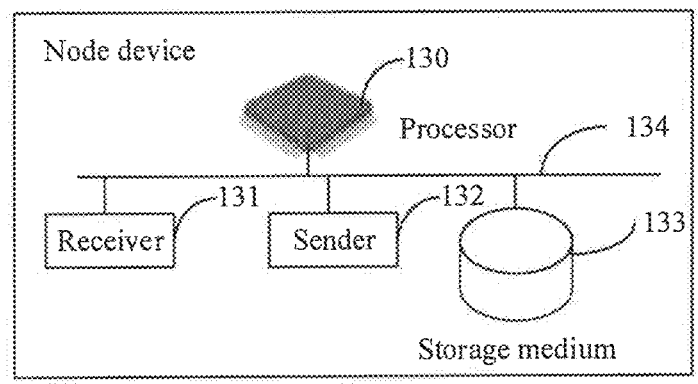
FIG. 13 is an implementation diagram of a hardware structure of another node device according to an embodiment of the disclosure.

In addition, during a practical application, referring to FIG. 13, the determination part 1202 may be implemented by a processor 130 located in a node device, specifically a CPU, an MPU, a DSP or an FPGA, etc. The receiving part 1201 may be implemented by a sender 132. The node device may further include a receiver 131 and a storage medium 133. The receiver 131, the sender 132 and the storage medium 133 are all connected with the processor 130 through a system bus 134. The storage medium 133 is configured to store executable program instructions. The storage medium 133 may include a high-speed RAM and may also include a nonvolatile memory, for example, at least one disk memory. The processor 130 is configured to execute the stored executable instructions, and the executable instructions are configured to execute the operations of the transmission control method of embodiment 3.

Embodiment 8

Figure 14:
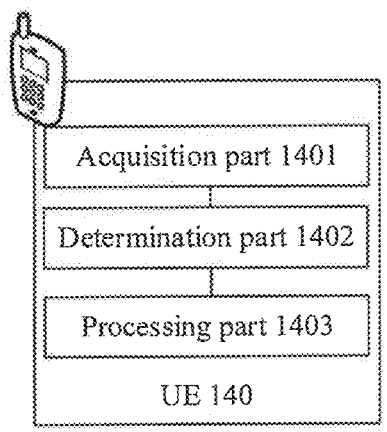
FIG. 14 is a structure diagram of UE according to an embodiment of the disclosure.

Based on the same inventive concept of embodiment 5, referring to FIG. 14, UE 140 provided in the embodiment of the disclosure is shown, which may include an acquisition part 1401, a determination part 1402 and a processing part 1403. The acquisition part 1401 is configured to acquire an on-off state of a data duplication transmission mode from a first node device.

The determination part 1402 is configured to determine a processing strategy for a MAC message sent by a second node device according to the on-off state of the data duplication transmission mode.

The processing part 1403 is configured to process the MAC message sent by the second node device according to the processing strategy. The first node device controls data duplication transmission through an RRC message and the second node device being a node device controlling data duplication transmission through the MAC message.

In a possible implementation mode, the acquisition part 1401 is configured to perform the following operations.

The RRC message sent by the first node device is acquired or monitored. The RRC message is analyzed to learn about whether the first node device controls the on-off state of the data duplication transmission mode and that the first node device turns on or turns off the data duplication transmission mode.

In a possible implementation mode, the processing part 1403 is configured to perform the following operations.

When the data duplication transmission mode is in the on state, the MAC message sent by the second node device is received, and a data duplication transmission capability is activated or deactivated according to the MAC message. The MAC message indicates an activation state of the data duplication transmission capability and the activation state includes an activated or deactivated state.

When the data duplication transmission mode is in the off state, the MAC message sent by the second node device is ignored.

It can be understood that, in the embodiment and other embodiments, "part" may be part of a circuit, part of a processor, part of a program or software and the like, of course, may also be a unit, and may also be modular and non-modular.

In addition, each component in the embodiment may be integrated into a processing unit, each unit may also exist independently, and two or more than two units may also be integrated into a unit. The integrated unit may be implemented in a hardware form and may also be implemented in form of software function module.

When implemented in form of software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of software product, and the computer software product is stored in a storage medium, including a plurality of instructions configured to enable a computer device (which may be a personal computer, a server, a network device or the like) or a processor to execute all or part of the operations of the method in the embodiment. The storage medium includes: various media capable of storing program codes such as a U disk, a mobile hard disk, a ROM, a RAM, a magnetic disk or an optical disk.

Therefore, the embodiment provides a computer storage medium, which stores machine instructions, the machine instructions being executed by one or more processors to enable the processor to execute the following operations.

An on-off state of a data duplication transmission mode is acquired from a first node device.

A processing strategy for a MAC message sent by a second node device is determined according to the on-off state of the data duplication transmission mode, and the MAC message sent by the second node device is processed according to the processing strategy. The first node device controls data duplication transmission through an RRC message and the second node device is a node device controlling data duplication transmission through the MAC message.

Optionally, as another embodiment, the machine instructions are operated by the processor to further execute the following operation.

The RRC message sent by the first node device is acquired or monitored, and the RRC message is analyzed to learn about whether the first node device controls the on-off state of the data duplication transmission mode and that the first node device turns on or turns off the data duplication transmission mode.

Optionally, as another embodiment, the machine instructions are operated by the processor to further execute the following operations.

When the data duplication transmission mode is in the on state, the MAC message sent by the second node device is received, and a data duplication transmission capability is activated or deactivated according to the MAC message, the MAC message being configured to indicate an activation state of the data duplication transmission capability and the activation state including an activated or deactivated state.

When the data duplication transmission mode is in the off state, the MAC message sent by the second node device is ignored.

Figure 15:
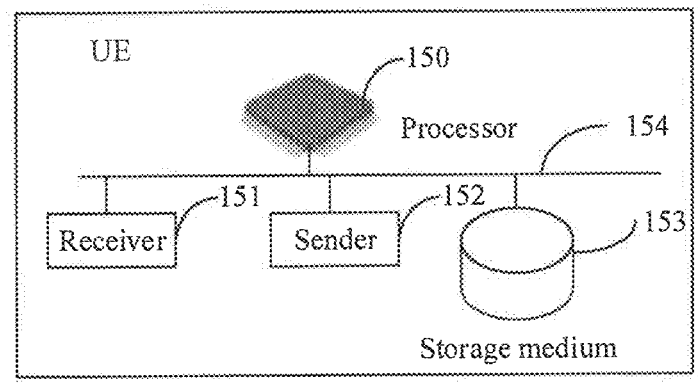
FIG. 15 is an implementation diagram of a hardware structure of UE according to an embodiment of the disclosure.

In addition, during a practical application, referring to FIG. 15, the determination part 1402 and the processing part 1403 may be implemented by a processor 150 located in a node device, specifically a CPU, an MPU, a DSP or an FPGA, etc. The acquisition part 1401 may be implemented by a sender 152. The node device may further include a receiver 151 and a storage medium 153. The receiver 151, the sender 152 and the storage medium 153 are all connected with the processor 150 through a system bus 154. The storage medium 153 is configured to store executable program instructions. The storage medium 153 may include a high-speed RAM and may also include a nonvolatile memory, for example, at least one disk memory. The processor 150 is configured to execute the stored executable instructions, and the executable instructions are configured to execute the operations of the transmission control method of embodiment 5.

Embodiment 9

Figure 16:
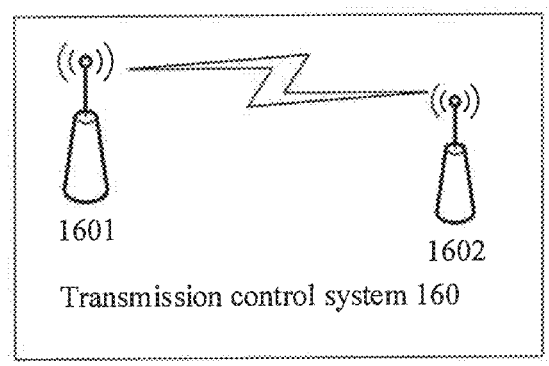
FIG. 16 is a structure diagram of a transmission control system according to an embodiment of the disclosure.

Based on the same inventive concept of the abovementioned embodiments, referring to FIG. 16, a transmission control system 160 provided in the embodiment of the disclosure is shown. The system includes a first node device 1601 and a second node device 1602. A control manner of the first node device 1601 for data duplication transmission is different from a control manner of the second node device for data duplication transmission.

The first node device 1601 is configured to send a notification message to the second node device through a network device. The notification message indicates that a data duplication transmission mode is in an on state or the data duplication transmission mode is in an off state.

The second node device 1602 is configured to determine according to the notification message that the data duplication transmission mode is in the on state or the off state.

When the data duplication transmission mode is in the on state, the second node device 1602 is configured to control an activation state of a data duplication transmission capability through a MAC message, the activation state including an activated or deactivated state.

When the data duplication transmission mode is in the off state, the second node device 1602 is configured to not control the activation state of the data duplication transmission capability.

It can be understood that, when the first node device 1601 in the system 160 involved in the embodiment is a master node device and the second node device 1602 is a slave node device, a specific process of the transmission control method in embodiment 1 may be implemented by the system 160 described in the embodiment. Elaborations thereof are omitted in the embodiment.

Embodiment 10

Figure 17:
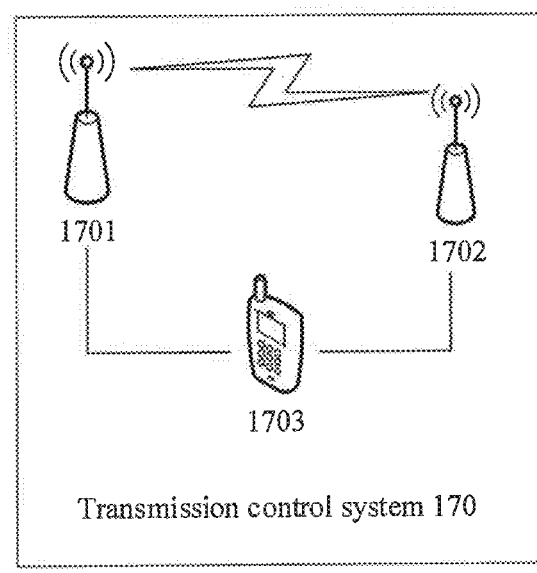
FIG. 17 is a structure diagram of another transmission control system according to an embodiment of the disclosure.

Based on the same inventive concept of the abovementioned embodiments, referring to FIG. 17, a transmission control system 170 provided in the embodiment of the disclosure is shown. The system includes a first node device 1701, a second node device 1702 and UE 1703. A control manner of the first node device 1701 for data duplication transmission is different from a control manner of the second node device 1702 for data duplication transmission.

The first node device 1701 is configured to control an on-off state of a data duplication transmission mode through an RRC message.

The UE 1703 is configured to acquire the on-off state of the data duplication transmission mode, determine a processing strategy for a MAC message sent by the second node device 1702 according to the on-off state of the data duplication transmission mode and process the MAC message sent by the second node device 1702 according to the processing strategy.

In a possible implementation mode, the UE 1703 is configured to perform the following operations.

When the data duplication transmission mode is in the on state, receive the MAC message sent by the second node device 1702 and activate or deactivate a data duplication transmission capability according to the MAC message. The MAC message indicates an activation state of the data duplication transmission capability and the activation state includes an activated or deactivated state.

When the data duplication transmission mode is in the off state, ignore the MAC message sent by the second node device 1702.

It can be understood that, when the first node device 1701 in the system 170 involved in the embodiment is a master node device and the second node device 1702 is a slave node device, a specific process of the transmission control method in embodiment 4 may be implemented by the system 170 described in the embodiment. Elaborations thereof are omitted in the embodiment.

Those skilled in the art should know that the embodiment of the disclosure may be provided as a method, a system or a computer program product. Therefore, the disclosure may adopt a form of hardware embodiment, software embodiment or combined software and hardware embodiment. Moreover, the disclosure may adopt a form of computer program product implemented on one or more computer-available storage media (including, but not limited to, a disk memory and an optical memory) including computer-available program codes.

The disclosure is described with reference to flowcharts and/or block diagrams of the method, device (system) and computer program product according to the embodiments of the disclosure. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of another programmable data processing device to generate a machine, so that a device for realizing a function specified in one flow or multiple flows in the flowcharts and/or one block or multiple blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction device may be generated by the instructions stored in the computer-readable memory, the instruction device realizing the function specified in one flow or multiple flows in the flowcharts and/or one block or multiple blocks in the block diagrams.

These computer program instructions may further be loaded onto the computer or the other programmable data processing device, so that a series of operations are executed on the computer or the other programmable data processing device to generate processing implemented by the computer, and operations for realizing the function specified in one flow or multiple flows in the flowcharts and/or one block or multiple blocks in the block diagrams are provided by the instructions executed on the computer or the other programmable data processing device.

The above is only the preferred embodiment of the disclosure and not intended to limit the scope of protection of the disclosure.

INDUSTRIAL APPLICABILITY

In the embodiments, control over data duplication transmission is coordinated through interaction and notification between the node devices or through the UE. Ordered control over data duplication transmission is implemented, the control manners of the two node devices for data duplication transmission of the bearer are coordinated, and occurrence of the control conflict is further avoided.

The invention claimed is:

1. A transmission control method, applied to a Main Evolved Node B (MeNB), which controls data duplication transmission through a Radio Resource Control (RRC) message, wherein the data duplication transmission is Packet Data Convergence Protocol (PDCP) duplication transmission, and the method comprises:
   turning on, by the MeNB, the data duplication transmission mode through the RRC message; or
   turning off, by the MeNB, the data duplication transmission mode through the RRC message; and
   sending, by the MeNB, a notification message to a Secondary Evolved Node B (SeNB), wherein the notification message indicates that the data duplication transmission mode is in the on state or the data duplication transmission mode is in the off state,
   wherein sending, by the MeNB, the notification message to the SeNB comprises:
   sending, by the MeNB, the notification message to the SeNB through an interface between network nodes.

2. The method of claim 1, wherein the SeNB controls data duplication transmission through a Medium Access Control (MAC) message.

3. The method of claim 1, wherein interface between network nodes comprises an X2 interface.

4. The method of claim 1, wherein the notification message is independent and different from the RRC message.

5. The method of claim 1, wherein the SeNB controls data duplication transmission through a Medium Access Control (MAC) message, and a control manner of the MeNB for data duplication transmission is different from a control manner of the SeNB for data duplication transmission.

6. A transmission control method, applied to User Equipment (UE), which represents a user side, the method comprises:
   acquiring an on-off state of a data duplication transmission mode from a Main Evolved Node B (MeNB), wherein the data duplication transmission is Packet Data Convergence Protocol (PDCP) duplication transmission, and the MeNB turns on or turns off the data duplication transmission mode through a Radio Resource Control (RRC) message; and
   determining a processing strategy for a Medium Access Control (MAC) message sent by a Secondary Evolved Node B (SeNB) according to the on-off state of the data duplication transmission mode, and processing the MAC message sent by the SeNB according to the processing strategy, and the MeNB communicated with the SeNB through an interface between network nodes.

7. The method of claim 6, wherein the SeNB controls data duplication transmission through the MAC message.

8. The method of claim 7, wherein acquiring the on-off state of the data duplication transmission mode from the MeNB comprises:
   acquiring and monitoring the RRC message sent by the MeNB, and analyzing the RRC message to learn about whether the MeNB controls the on-off state of the data duplication transmission mode and learn about whether the MeNB turns on or turns off the data duplication transmission mode.

9. The method of claim 8, wherein determining the processing strategy for the MAC message sent by the SeNB according to the on-off state of the data duplication transmission mode and processing the MAC message sent by the SeNB according to the processing strategy comprises:
   responsive to the data duplication transmission mode being in the on state, receiving the MAC message sent by the SeNB, and activating or deactivating a data duplication transmission capability according to the MAC message, wherein the MAC message indicates an activation state of the data duplication transmission capability and the activation state comprises an activated or deactivated state.

10. The method of claim 8, wherein determining the processing strategy for the MAC message sent by the SeNB according to the on-off state of the data duplication transmission mode and processing the MAC message sent by the SeNB according to the processing strategy comprises:
    responsive to the data duplication transmission mode being in the off state, ignoring the MAC message sent by the SeNB.

11. The method of claim 6, wherein the notification message is independent and different from the RRC message.

12. The method of claim 6, wherein the SeNB controls data duplication transmission through the MAC message, and a control manner of the MeNB for data duplication transmission is different from a control manner of the SeNB for data duplication transmission.

13. A transmission control system, comprising a Main Evolved Node B (MeNB), a Secondary Evolved Node B (SeNB) and User Equipment (UE), wherein a control manner of the MeNB for data duplication transmission is different from a control manner of the SeNB for data duplication transmission, wherein the data duplication transmission is Packet Data Convergence Protocol (PDCP) duplication transmission;
    the MeNB is configured to turn on or turn off a data duplication transmission mode through a Radio Resource Control (RRC) message, and send a notification message to the SeNB through an interface between network nodes, wherein the notification message indicates that the data duplication transmission mode is in the on state or the data duplication transmission mode is in the off state; and
    the UE is configured to acquire the on-off state of the data duplication transmission mode, and
    determine a processing strategy for a Medium Access Control (MAC) message sent by the SeNB according to the on-off state of the data duplication transmission mode and process the MAC message sent by the SeNB according to the processing strategy.

14. The system of claim 13, wherein the UE is configured to:
responsive to the data duplication transmission mode being in the on state, receive the MAC message sent by the SeNB and activate or deactivate a data duplication transmission capability according to the MAC message, wherein the MAC message indicates an activation state of the data duplication transmission capability and the activation state comprises an activated or deactivated state.

15. The system of claim 13, wherein the SeNB controls data duplication transmission through the MAC message.

16. The system of claim 13, wherein the SeNB is configured to receive a notification message sent by the MeNB, wherein the notification message indicates that a data duplication transmission mode is in an on state or the data duplication transmission mode is in an off state.

17. The system of claim 16, wherein the SeNB is configured to determine whether to control an activation state of a data duplication transmission capability through the MAC message according to the on-off state, indicated in the notification message, of the data duplication transmission mode, wherein the activation state comprises activated or deactivated states.

18. The system of claim 17, wherein the SeNB is further configured to:
responsive to determining, according to the notification message, that the data duplication transmission mode is in the on state, control the activation state of the data duplication transmission capability through the MAC message.

19. The system of claim 17, wherein the SeNB is further configured to:
responsive to determining, according to the notification message, that the data duplication transmission mode is in the off state, not control the activation state of the data duplication transmission capability.

20. The system of claim 13, wherein the UE is configured to:
responsive to the data duplication transmission mode being in the off state, ignore the MAC message sent by the SeNB.

* * * * *